United States Patent [19]

Keck

[11] Patent Number: 4,851,725
[45] Date of Patent: Jul. 25, 1989

[54] TERMINAL BLOCK ASSEMBLY FOR A LEADLESS MOTOR

[75] Inventor: Arthur C. Keck, Fort Wayne, Ind.

[73] Assignee: General Electric Company, Fort Wayne, Ind.

[21] Appl. No.: 155,365

[22] Filed: Feb. 12, 1988

[51] Int. Cl.[4] ............... H02K 11/00; H01K 29/00
[52] U.S. Cl. ............................ 310/71; 310/43; 439/353
[58] Field of Search ............... 310/42, 43, 71, 88, 310/89; 439/353, 354, 680

[56] References Cited

U.S. PATENT DOCUMENTS

| | | | |
|---|---|---|---|
| 3,012,159 | 12/1961 | Druesedow | 310/71 |
| 3,283,186 | 11/1966 | Perry . | |
| 3,399,374 | 8/1968 | Pauza et al. | 439/680 |
| 3,501,736 | 3/1970 | Norris | 439/353 |
| 3,502,917 | 3/1970 | Bizoe . | |
| 3,518,616 | 6/1970 | Lewis . | |
| 3,524,089 | 8/1970 | Willits . | |
| 3,983,428 | 9/1976 | Bitsch et al. . | |
| 3,984,712 | 10/1976 | Hill . | |
| 4,213,070 | 7/1980 | Lund et al. . | |
| 4,429,243 | 1/1984 | Crow | 174/138 F |
| 4,523,117 | 6/1985 | Daniels . | |
| 4,585,964 | 4/1986 | Hildebrandt . | |
| 4,677,330 | 6/1987 | Watanabe et al. | 310/42 |
| 4,727,274 | 2/1988 | Adam et al. | 310/71 |
| 4,748,355 | 5/1988 | Anderson et al. | 310/71 |

*Primary Examiner*—Patrick R. Salce
*Assistant Examiner*—D. L. Rebsch

*Attorney, Agent, or Firm*—Ralph E. Krisher, Jr.

[57] ABSTRACT

A terminal block assembly for a leadless motor comprises a terminal block housing, an arrangement for securing the housing in an opening in a motor shell, plural spaced-apart motor leads and terminals molded into the housing, a latching mechanism for providing a positive "lock" with a mating connector assembly, and provisions for preventing the connector assembly from being matingly received by the terminal block assembly in other than a predetermined desired orientation. The latching mechanism comprises an open box-like structure formed on an exterior surface of a horizontal side wall of the terminal block housing. The assembly is provided with a raised projection on an exterior surface of a second horizontal side wall, in substantially opposing relation to the open box-like structure of the latching mechanism, to prevent mating of the connector and terminal block assemblies when the connector assembly is rotated 180° from the predetermined desired orientation. The terminal block further includes plural vertically oriented separating walls and end walls extending between the first and second horizontal side walls to form box-like enclosures around the motor terminals. The wall thicknesses of the separating walls are substantially uniform, corresponding to widths of respective mating openings on the connector assembly, while the wall thickness of the end walls are substantially greater to prevent mating of the connector and terminal assemblies when the connector assembly is laterally offset from the predetermined desired orientation.

27 Claims, 2 Drawing Sheets

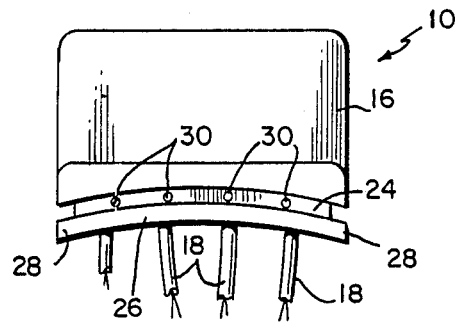
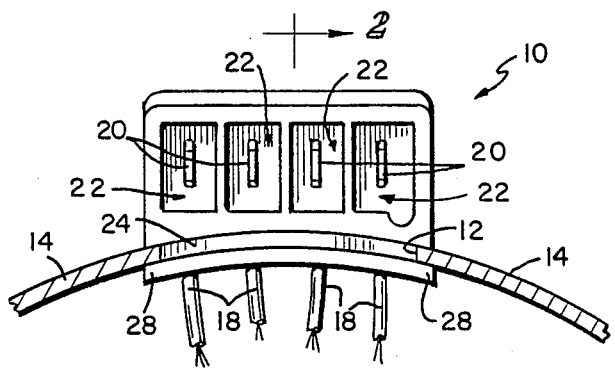
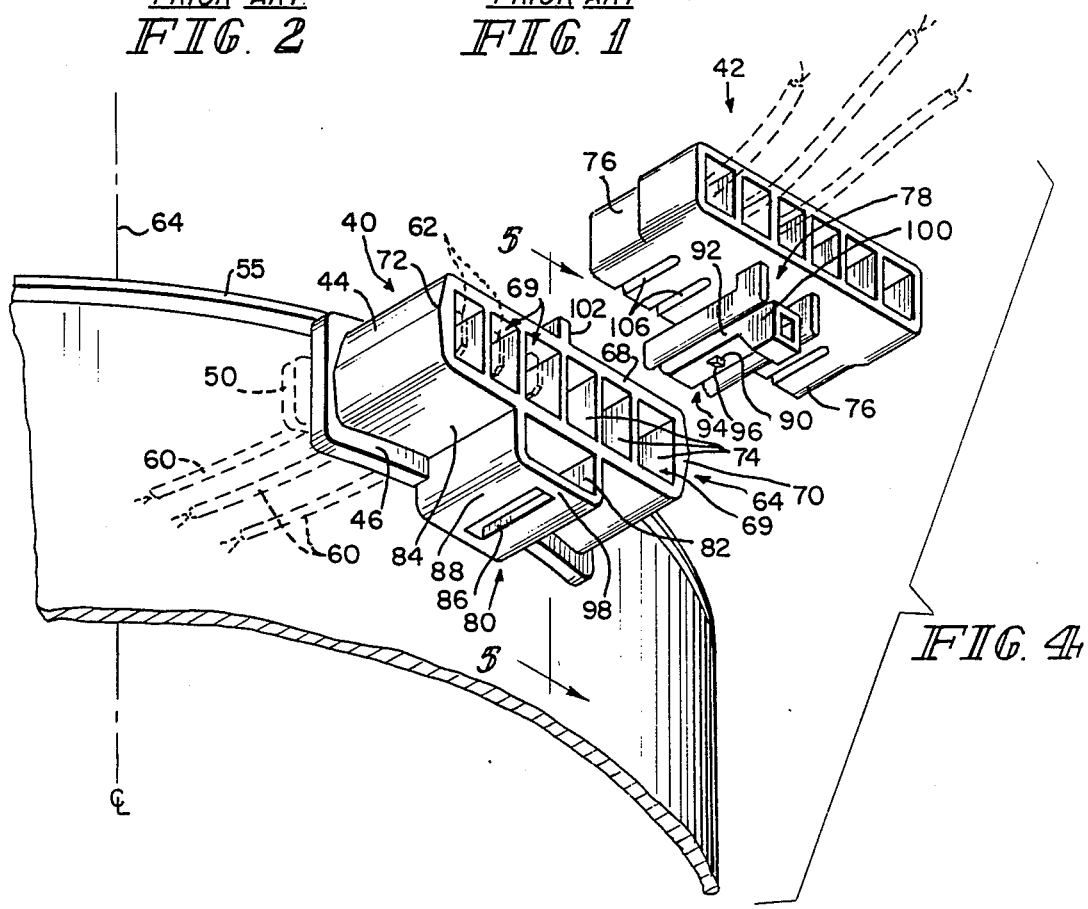

TERMINAL BLOCK ASSEMBLY FOR A LEADLESS MOTOR

BACKGROUND AND SUMMARY OF THE INVENTION

This invention relates generally to a terminal block assembly for a leadless electric motor and, more particularly, to a multi-wire terminal block assembly which is especially well-suited for use with a mating connector assembly.

Small electric motors typically include a stator assembly having one or more windings, a rotor assembly rotatably mounted within the stator assembly, a shell or housing surrounding the stator assembly, and end bell assemblies fitted to the ends of the shell. The rotor assembly includes a rotating shaft which is supported in bearings carried by the end bell assemblies. In order to connect the windings of the stator assembly to an external source of power, it is necessary for conductors to pass through the motor shell or end bells. It is often desirable to use a terminal block assembly which is mounted in the shell of the motor housing for this purpose. The terminal block assembly typically includes a plurality of terminals which are connected by wires to the windings of the stator assembly, and which are exposed for connection to external conductors or mating terminals. Examples of terminal block assemblies of this general type are shown in U.S. Pat. Nos. 3,012,159 and 4,429.243.

Terminal block assemblies used with relatively small electric motors (such as fractional or low horsepower motors) must meet a number of important design criteria. Such terminal block assemblies must be relatively low in cost and relatively easy to install to avoid adding unduly to the cost of manufacturing the motor. These terminal block assemblies must also be sturdily constructed and capable of secure and vibration-free attachment to the motor shell. It is also desirable that such terminal block assemblies be designed to prevent the entry of dust, dirt, moisture and other contaminants into the motor.

Small electric motors which incorporate terminal block assemblies of the type described above and below are often referred to as "leadless" motors. Leadless motors are used in a variety of applications and are often installed under "field" conditions by personnel having varying levels of training and experience. Accordingly, it is desirable and advantageous to provide, in the design of the subject terminal block assemblies, a mechanism for assuring positive and reliable connection to one or more mating connector assemblies. It is also desirable and advantageous to provide features which prevent connection of a mating connector assembly to the terminal block assembly in other than a predetermined desired orientation to minimize the possibility of faults resulting from unintentional misconnections.

An object of the present invention is to provide a terminal block assembly for a leadless electric motor which is relatively inexpensive to produce and install.

Another object of the present invention is to provide a terminal block assembly which is sturdily constructed and which is resistant to vibration and loosening of its components.

Yet another object of the present invention is to provide a terminal block assembly which may be readily and securely mounted in the shell of an electric motor.

Yet another object of the present invention is to provide a terminal block assembly which incorporates a latching mechanism to provide for positive and reliable connection to a mating connector assembly.

Still another object of the present invention is to provide a terminal block assembly which prevents connection of a mating connector assembly in other than a predetermined desired orientation.

These and other objects of the invention are attained in a terminal block assembly for a leadless motor which is constructed in accordance with the present invention. A preferred embodiment of the terminal block assembly includes a housing, and means for securing the housing in an opening, such as a slot, in a shell of the motor. A plurality of spaced-apart motor leads and terminals are mounted in the housing such that the motor leads extend inwardly of the shell, and the terminals extend radially outwardly from a central axis of the motor. The preferred embodiment further includes means on the housing for receiving a mating connector assembly having a plurality of spaced-apart leads and terminals, corresponding to the motor leads and terminals mounted in the housing. The invention further includes means on the housing for receiving a latching mechanism on the mating connector assembly to releasably secure the mating connector assembly to the terminal block assembly. The preferred embodiment is further provided with means on the housing for preventing the mating connector assembly from being matingly received by the terminal block assembly in other than a predetermined desired orientation.

In a preferred embodiment, the terminal block assembly of the present invention is molded as a single piece from a flame resistant thermoplastic material, such as General Electric VALOX 310SEO or VALOX 325. The plurality of spaced-apart motor leads and terminals are preferably molded in place, rather than affixed to the housing afterward to reduce possible movement and vibration of the leads and terminals, to promote better sealing of the motor, and to otherwise enhance the unitary nature of the assembly.

The means on the terminal block housing for receiving a mating connector assembly preferably includes first and second generally horizontal opposing side walls, first and second generally vertical opposing end walls extending between respective ends of the first and second horizontal side walls, and a plurality of spaced apart, generally vertical separating walls extending between the first and second horizontal side walls to create a plurality of open box-like enclosures around the exposed ends of the plurality of motor terminals mounted in the housing. The open box-like enclosures of the terminal block assembly receive box-like extensions of the connector assembly in a mating relationship. The means on the housing for receiving a latching mechanism on the connector assembly comprises an open box-like structure formed on an exterior surface of the first horizontal side wall. The open box-like structure includes means, such as a window-like opening formed in a surface of the box-like structure, for retaining a locking edge of the locking mechanism on the connector assembly. The locking mechanism is easily disengaged by applying pressure to an extending tab to disengage the locking edge of the latching mechanism from the window of the box-like structure on the terminal block assembly.

An additional feature of the preferred embodiment of the invention includes means on the housing for preventing the mating connector assembly from being received by the terminal block assembly in other than a predetermined desired orientation. This means preferably includes a raised projection formed on an exterior surface of the second horizontal side wall, in substantially opposing relation to the open box-like structure formed on an exterior surface of the first horizontal side wall, such that the raised projection interacts with the latching mechanism of the connector assembly to prevent mating of the connector and terminal block assemblies when the connector assembly is rotated 180° from the predetermined desired orientation. Additional safeguards include forming the separating walls to have substantially uniform wall thicknesses, corresponding to widths of respective mating openings on the connector assembly, and forming at least a portion of the end walls to have substantially greater wall thicknesses than the separating walls to prevent mating of the connector and terminal assemblies when the connector assembly is laterally (horizontally) offset from the predetermined desired orientation.

The means for securing the housing in the opening in the motor shell preferably comprises a plurality of radially-spaced flanges, including a fitted flange having a radius of curvature substantially equal to the radius of curvature of the motor shell, an outer flange having a radius of curvature slightly greater than the radius of curvature of the motor shell, and an inner flange having a radius of curvature slightly less than the radius of curvature of the motor shell. The fitted flange is dimensioned to fit within a slot or opening formed in an end of the motor shell such that first, second and third edges of the flange abut respective first, second and third edges of the slot. At least two of the edges of the outer and inner flanges extend along the exterior and interior surface of the motor shell, respectively, beyond the abutting edges of the fitted flange and the slot to prevent inward and outward radial movements of the housing. An end bell of the motor abuts a fourth edge of the fitted flange to trap the flange between an edge of the slot and the end bell, to prevent axial movements of the housing. In an especially preferred embodiment, a plurality of crushable projections are formed on the edge of the fitted flange which abuts the end bell of the motor, to assure that the fitted flange is securely fixed between the edges of the slot in the end bell, notwithstanding normal tolerance variations in machining the slot and end bell, or in forming the terminal block assembly.

BRIEF DESCRIPTION OF THE DRAWINGS

FIG. 1 shows a front view of a prior art terminal block assembly.

FIG. 2 shows a sectional view of the prior art terminal block assembly of FIG. 1, taken along line 2—2 of FIG. 1.

FIG. 3 shows a rear view of the prior art terminal block assembly of FIG. 1.

FIG. 4 shows a perspective view of the terminal block assembly of the present invention mounted in the shell of an electric motor, and a mating connector assembly positioned immediately prior to insertion into the terminal block assembly.

DETAILED DESCRIPTION OF THE DRAWINGS

Figure 5:
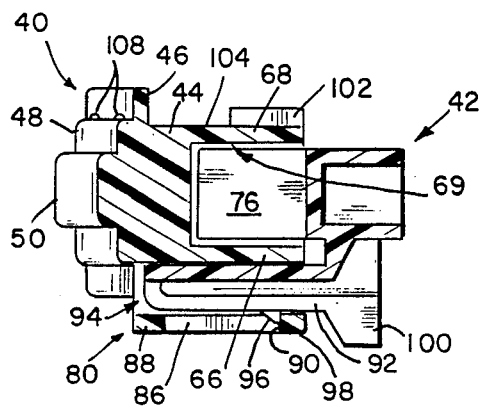
FIG. 5 shows a cross-sectional view of the terminal block assembly of FIG. 4, with the connector assembly inserted and locked in place, taken along lone 5—5 of FIG. 4.

FIG. 1 shows a front view of a prior art terminal block assembly 10 installed in a slot 12 of a partially illustrated shell 14 of a motor housing. Terminal block assembly 10 comprises a molded thermoplastic housing 16 in which a plurality of motor leads 18 and terminals 20 are molded in place. Each terminal extends into an open, box-like enclosure 22 having an open end which faces in an axial direction, relative to the center axis of the motor (i.e., the axis of rotation of the motor shaft).

Terminal block assembly 10 is secured in slot 12 by an arrangement which includes a fitted flange 24, having dimensions substantially equal to the dimensions of slot 12, and an inner flange 26 having edges 28 which extend beyond the respective edges of flange 24 and slot 12 to prevent outward radial movement of terminal block assembly 10. Inward radial movement is prevented by contact between thermoplastic housing 16 and the outer surface of motor shell 14 in the area immediately surrounding the edges of slot 12. Axial movements (i.e., into or out of the paper, as viewed in FIG. 1) of terminal block assembly 10 are prevented by an inner edge of slot 12 (not shown) and by the end bell of the motor housing (also not shown). Crushable projections 30 (FIG. 3) are on either the surface of flange 24 which faces the end bell housing, or on the directly opposing surface which faces the inner edge of slot 12, to assure a tight, vibration-free fitting of terminal block assembly 10 to the motor shell, notwithstanding normal variations in tolerances of the dimensions of slot 12 and the end bell housing.

FIG. 4 shows a perspective view of terminal block assembly 40 of the present invention, along with a mating connector assembly 42 positioned for insertion into terminal block assembly 40. Terminal block assembly 40 includes a molded thermoplastic housing 44, and a radially-spaced arrangement of three flanges 46, 48 and 50 for securing the housing within a slot 52 (FIGS. 6 and 8) of motor shell 54. The specific relationships and interactions between flanges 46, 48 and 50 of terminal block assembly 40, slot 52 of motor shell 54, and end bell 55 of the motor housing, are best illustrated in FIGS. 6-9, and will be discussed in detail below by reference to those figures.

Spaced-apart motor leads 60 and terminals 62 are molded into housing 44. Up to six terminals and leads can be accommodated in the respective positions of the preferred embodiment of the invention illustrated, although specific applications may result in the use of less than all six positions. Motor leads 60 extend inwardly of motor shell 54, and are connected to the coils, windings, or other internal components of the motor. Terminals 62 extend radially outward, relative to longitudinal axis 64 of the motor, which defines the central axis of rotation of the motor shaft. This orientation of motor terminals 62 in terminal block assembly 40 allows for unrestricted access to all sides of connector assembly 42, as will be more readily apparent from the discussion which follows.

The outer portion 64 of housing 44 receives mating portions of connector assembly 42, for separating and protecting the outwardly extending exposed portions of terminal 62. Outer portion 64 comprises a first generally horizontal side wall 66, a second generally horizontal opposing side wall 68, generally vertical opposing end walls 70 and 72 extending between respective ends of horizontal side walls 66 and 68, and spaced-apart, generally vertical separating walls 74, also extending between horizontal side walls 66 and 68 to create open box-like enclosures 69 around the exposed ends of motor terminals 62. Open box-like enclosures 69 are specifically designed to receive slightly undersized box-like extensions 76 on connector assembly 42, as is most clearly shown in FIG. 5. The outermost ends of the box-like enclosures extend beyond the outermost ends of terminals 62 to provide maximum protection against accidental short circuiting of and contact with terminals 62.

It should be noted at this point that the terms "horizontal" and "vertical" will be used in this discussion to describe relative orientations of certain features of the present invention, as those features are illustrated in FIGS. 4-9 of this application. These terms are not intended to describe or limit the actual orientation of terminal block assembly 40 or motor shell 54 in an operating environment. The features that are described as being "horizontal" (e.g., side walls 66 and 68) are in fact horizontal in the views illustrated in, for example, FIGS. 4 and 6. In actual operation, these same features may be oriented non-horizontally, relative to the earth or surrounding structures, depending upon the orientation and mounting of the associated motor.

Terminal block assembly 40 further includes a structure for receiving a latching mechanism 78 on connector assembly 40 to releasably secure connector assembly 42 to terminal block assembly 40. In the preferred embodiment of the invention, this structure comprises a box-like structure 80 having an open end 82, which is integrally molded on external surface 84 of horizontal side wall 66. A slot-shaped opening or window 86 is formed in surface 88 of structure 80 for receiving a downwardly extending locking edge 90 on an elastically movable arm portion 92 of latching mechanism 78. As forward end 94 of latching mechanism 78 is inserted into opening 82 of structure 80, arm 92 is cammed upwardly by the interaction between sloped surface 96 (immediately adjacent locking edge 90) and portion 98 of structure 80. As connector assembly 42 reaches the fully engaged position shown in FIG. 5, arm 92 (which is elastically movable in the vertical direction) moves downwardly to secure locking edge 90 within window 86 and behind portion 98 to lock connector assembly 42 into position. To release latching mechanism 78, arm 92 is moved upwardly (as viewed in FIG. 5) by exerting upward pressure on tab 100. It should be noted that the relative orientation and features of terminal block assembly 40 allow for unrestricted access to latching mechanism 78, and allow for "one hand" operation (i.e., engagement and disengagement) of terminal block assembly 40 and connector assembly 42. The positioning of latching mechanism 78 and corresponding latch receiving structure 80 in the respective centers (along the long or horizontal axis) of assemblies 42 and 40 facilitates engagement and disengagement of the assemblies.

An additional feature of the preferred embodiment of the present invention relates to a structure for preventing connector assembly 42 from being matingly received by terminal block assembly 40 in other than the predetermined desired orientation illustrated in FIGS. 4 and 5. In the preferred embodiment of the invention, this structure comprises a raised projection 102 formed on exterior surface 104 of side wall 68. Projection 102 is located substantially directly opposite structure 80, and is positioned at the approximate horizontal midpoint of side wall 68. The purpose of raised projection 102 is to prevent connector assembly 42 from being inserted into terminal block assembly 40 when connector assembly 42 is rotated 180° from the desired orientation illustrated in FIGS. 4 and 5. If an attempt is made to insert a "rotated" connector assembly 42 into terminal block assembly 40, forward end 94 of latch mechanism 78 strikes raised projection 102 to prevent the engagement of the two assemblies well in advance of contact between motor terminal 62 and the corresponding lead terminals in connector assembly 42. Although the configuration of projection 102 illustrated is particularly advantageous (in terms of the efficient use of material, non-interference with other aspects of the terminal block assembly, etc.) and is preferred, other configurations of projection 102 which similarly accomplish the desired functions are contemplated.

Another feature to prevent mating of connector assembly 42 and terminal block assembly 40 in other than the predetermined desired orientation relates to the relative wall thicknesses of separating walls 74 and vertical end walls 70 and 72. The wall thicknesses of separating walls 74 are substantially uniform, and correspond closely to the widths of corresponding slot-like openings 106 between adjacent box-like extensions 76 of connector assembly 42. In contrast, the wall thicknesses of end walls 70 and 72 are substantially thicker and, in the preferred embodiment illustrated, are substantially V-shaped in cross-section. This prevents mating of the connector and terminal assemblies when the connector assembly is laterally (i.e., horizontally) offset from the desired orientation illustrated by two or more terminal positions. This feature serves to prevent accidental or intentional contacts between terminals that might otherwise occur due to "partial" engagement involving one or more of the box-like openings and extensions of the terminal block assembly and connector assembly, respectively.

Figure 6:
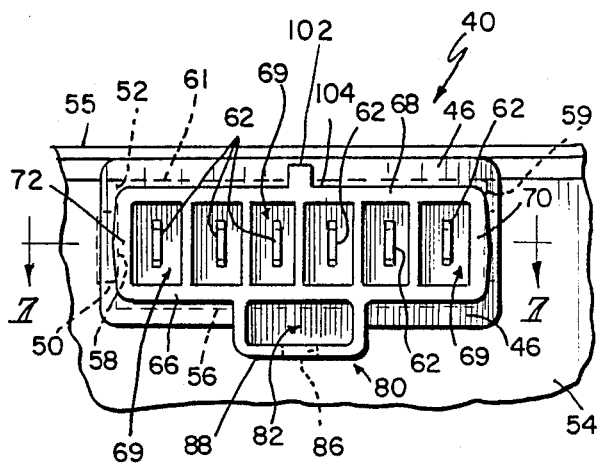
FIG. 6 shows a front view of the terminal block assembly of FIG. 4.

As noted previously, housing 44 of terminal block assembly 40 is secured to shell 54 of the motor by three radially-spaced or stacked flanges 46, 48 and 50 which interact with motor shell 54 and motor end bell 55. Fitted flange 48 is dimensioned to fit tightly within slot 52, with the three edges of slot 52 abutting respective edges of flange 48. With reference to FIG. 6, the innermost edge of slot 52 and a corresponding edge of flange 48 abut along horizontal dashed line 56. The remaining edges of slot 52 and flange 48 abut along dashed vertical lines 58 and 59, respectively. Other flange 46 extends outwardly from the circumference of housing 44 along the external surface of motor shell 54 to overlay the abutting edges of flange 48 and slot 52, and a portion of the horizontal junction between motor shell 54 and end bell 55 (represented by dashed line 61 in FIG. 6). Flange 46 prevents radially inward movements of terminal block assembly 40. Flange 46 further serves to shield the abutting edges of flange 48 and slot 52 from view, and to seal any openings which may exist along these edges to prevent internal contamination of the motor.

Figure 8:
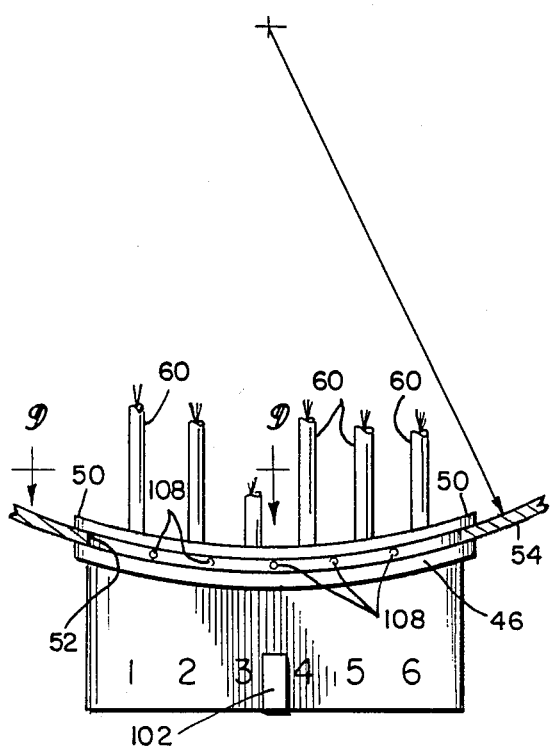
FIG. 8 shows a top view of the terminal block assembly of FIG. 4 with the end bell of the motor housing removed.

As noted, flange 48 is sized, in vertical and horizontal dimensions, to be approximately equal to the dimensions of slot 52. The radius of curvature of flange 48 is substantially equal to the radius of curvature of motor shell 54. The radii of curvature of outer flange 46 and innermost flange 50 are slightly greater than and slightly less than the radius of curvature of motor shell 54, respectively. Accordingly, a generally tight mating relationship is achieved between the vertical and horizontal edges of slot 52 and the corresponding edges of flange 48. Along the top surface of flange 48, as best viewed in FIG. 8, are a plurality of crushable projections 108 which abut end bell 55 when the motor is fully assembled. Projections 108 assure that terminal block assembly 40 is firmly locked in place, notwithstanding normal variations in the mechanical tolerances of slot 52, flange 48, or other components. Alternatively, crushable projections 108 could be provided on the opposing surface of flange 48 which abuts the inner edge of slot 52.

Figure 9:
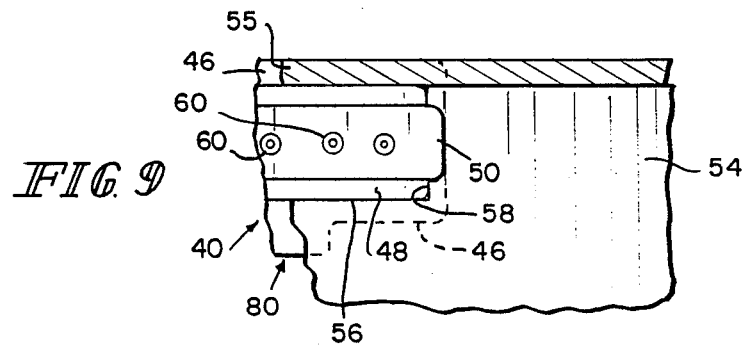
FIG. 9 shows a partial rear cross-sectional view of the terminal block assembly of FIG. 8, taken along line 9—9 of FIG. 8.

FIGS. 8 and 9 must clearly illustrate the relationship and function of innermost flange 50 of terminal block assembly 40. As can be seen in each of these figures, flange 50 extends along the line of the inner surface of motor shell 54 beyond the abutting vertical edges (as shown in FIG. 9) of flange 48 and slot 52. This arrangement prevents radially outward movements of terminal assembly 40.

Figure 7:
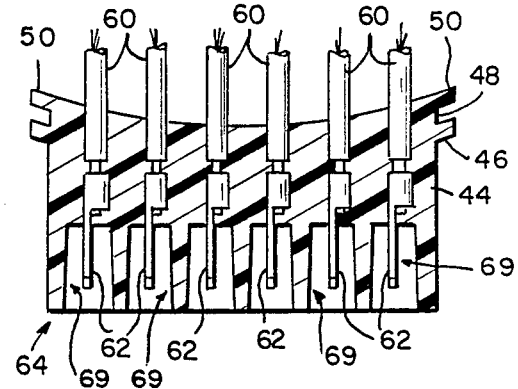
FIG. 7 shows a cross-sectional view of the terminal block assembly of FIG. 6, taken along line 7—7 of FIG. 6.

FIG. 7 is a cross-sectional view of terminal block assembly 40, taken along line 7—7 of FIG. 6. This cross-sectional view illustrates the relative positioning of motor leads and terminals 62 in the assembly. Leads 60 and terminals 62 are preferably molded in place as terminal block housing 44 is molded to assure firm movement and vibration-free retention of the terminals within housing 44, and to minimize possible pathways for contamination of the internal components of the motor.

Terminal block housing 44 is preferably injection molded as an integral unit from a flame-resistant or flame-retardant thermoplastic material. A particularly preferred material is General Electric VALOX 310SEO or VALOX 325.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A terminal block assembly for a leadless motor, comprising:
   a terminal block housing;
   means for securing the housing in an opening in a shell of the motor, said means comprising a plurality of radially spaced flanges, including a fitted flange having a radius of curvature substantially equal to the radius of curvature of the motor shell and having dimensions which are substantially equal to dimensions of the opening in the motor shell such that edges of the fitted flange and the opening abut, and including an outer flange having a radius of curvature greater than the radius of curvature of the motor shell and having dimensions which are greater than the dimensions of the opening in the motor shell such that said outer flange extends beyond and covers the abutting edges of the fitted flange and the opening;
   a plurality of spaced-apart motor leads and terminals mounted in said housing such that the motor leads extend inwardly of the shell, and the terminals extend radially outwardly relative to a central axis of the motor;
   means on said housing for receiving a mating connector assembly having a plurality of spaced-apart leads and terminals, corresponding to the motor leads and terminals mounted in the housing;
   means on said housing for receiving latching means on the mating connector assembly to releasably secure the mating connector assembly to the terminal block assembly; and
   means on said housing for preventing the mating connector assembly from being matingly received by the terminal block assembly in other than a predetermined desired orientation.

2. A terminal block assembly for a leadless motor, comprising:
   a terminal block housing;
   means for securing the housing in an opening in a shell of the motor;
   a plurality of spaced-apart motor leads and terminals mounted in said housing such that the motor leads extend inwardly of the shell, and the terminals extend radially outwardly relative to a central axis of the motor;
   means on said housing for receiving a mating connector assembly having a plurality of spaced-apart leads and terminals, corresponding to the motor leads and terminals mounted in the housing, said means for receiving a connector assembly comprising first and second generally horizontal opposing side walls and first and second generally vertical opposing end walls extending between respective ends of the first and second horizontal side walls;
   means on said housing for receiving latching means on the mating connector assembly to releasably secure the mating connector assembly to the terminal block assembly; and
   means disposed on an exterior surface of the second horizontal side wall for interacting with the latching means of the connector assembly to prevent mating of the connector and terminal block assemblies when the connector assembly is rotated 180° from a predetermined desired orientation.

3. A terminal block assembly according to claim 2, wherein said means disposed on an exterior surface of the second horizontal side wall for interacting with the latching mechanism of the connector assembly comprises a projection positioned at the approximate midpoint of the second horizontal side wall.

4. A terminal block assembly according to claim 2, wherein said means for receiving latching means comprises a box-like structure centrally disposed on an exterior surface of said first horizontal side wall.

5. A terminal block assembly according to claim 1, wherein an edge of an end bell of the motor abuts an edge of the fitted flange, and wherein the outer flange extends beyond and covers the abutting edge of the end bell and fitted flange.

6. A terminal block assembly according to claim 1, wherein said means on said housing for receiving a mating connector assembly comprises first and second generally horizontal opposing side walls, first and second generally vertical opposing end walls extending between respective ends of the first and second horizontal side walls, and a plurality of spaced-apart, generally vertical separating walls extending between the first and second horizontal side walls to create a plurality of open box-like enclosures around respective ones of the plurality of motor terminals mounted in the housing.

7. A terminal block assembly according to claim 6, wherein said means on said housing for receiving latching means comprises an open box-like structure formed on an exterior surface of said first horizontal side wall, and wherein said open box-like structure includes means for retaining a locking edge of said latching means on the connector assembly.

8. A terminal block assembly according to claim 7, wherein said means for retaining the locking edge of the latching means comprises a window formed in a surface of the box-like structure.

9. A terminal block assembly according to claim 7, wherein said means on said housing for preventing the mating connector assembly from being received by the terminal block assembly in other than a predetermined desired orientation comprises a raised projection formed on an exterior surface of said second horizontal side wall, in substantially opposing relation to the open box-like structure, such that the raised projection interacts with the latching means of the connector assembly to prevent mating of the connector and terminal block assemblies when the connector assembly is rotated 180 degrees from said predetermined desired orientation.

10. A terminal block assembly according to claim 9, wherein said means for preventing the mating connector assembly from being received by the terminal block assembly in other than a predetermined desired orientation further comprises forming said separating walls to have substantially uniform wall thicknesses, corresponding to widths of respective mating openings on the connector assembly, and forming at least a portion of said end walls to have substantially greater wall thicknesses than said separating walls to prevent mating of the connector and terminal assemblies when the connector assembly is laterally offset from said predetermined desired orientation.

11. A terminal block assembly according to claim 1, wherein the terminal block assembly comprises a unitary molded assembly, formed from a flame resistant thermoplastic material.

12. A terminal block assembly according to claim 11, wherein said plurality of motor leads and terminals are molded in place in the thermoplastic housing.

13. A terminal block assembly according to claim 1, wherein said plurality of radially spaced flanges further include an inner flange having a radius of curvature less than the radius of curvature of the motor shell and having at least one dimension which is greater than a corresponding dimension of the opening such that at least a portion of the inner flange extends beyond a portion of the abutting edges of the fitted flange and the opening.

14. A terminal block assembly according to claim 5, further comprising a plurality of crushable projections formed on an edge of the fitted flange to assure that the fitted flange is securely fixed between the edges of the opening and the end bell, notwithstanding normal tolerance variations.

15. A terminal block assembly for a leadless motor, comprising:

a terminal block housing;
means for securing the housing in an opening in a shell of the motor;
a plurality of spaced-apart motor leads and terminals mounted in said housing such that the motor leads extend inwardly of the shell, and the terminals extend radially outwardly relative to a central axis of the motor;
means on said housing for receiving a mating connector assembly having a plurality of spaced-apart leads and terminals, corresponding to the motor leads and terminals mounted in the housing;
means on said housing for receiving latching means on the mating connector assembly to releasably secure the mating connector assembly to the terminal block assembly; and
means on said housing for preventing the mating connector assembly from being matingly received by the terminal block assembly in other than a predetermined desired orientation;
wherein said means on said housing for receiving a mating connector assembly comprises first and second generally horizontal opposing side walls, first and second generally vertical opposing end walls extending between respective ends of the first and second horizontal side walls, and a plurality of spaced-apart, generally vertical separating walls extending between the first and second horizontal slide walls to create a plurality of open enclosures around respective ones of the plurality of motor terminals mounted in the housing; and
wherein said means on said housing for receiving latching means comprises an open box-like structure formed on an exterior surface of said first horizontal side wall, and wherein said open box-like structure includes means for retaining a locking edge of said latching means on the connector assembly; and
wherein said means on said housing for preventing the mating connector assembly from being received by the terminal block assembly in other than a predetermined desired orientation comprises a raised projection formed on an exterior surface of said second horizontal side wall, in substantially opposing relation to the open box-like structure, such that the raised projection interacts with the latching means of the connector assembly to prevent mating of the connector and terminal block assemblies when the connector assembly is rotated 180 degrees from said predetermined desired orientation.

16. A terminal block assembly according to claim 15, wherein said means for retaining the locking edge of the latching means comprises a window formed in a surface of the box-like structure.

17. A terminal block assembly according to claim 15, wherein said means for preventing the mating connector assembly from being received by the terminal block assembly in other than a predetermined desired orientation further comprises forming said separate walls to have substantially uniform wall thicknesses, corresponding to widths of respective mating openings on the connector assembly, and forming at least a portion of said end walls to have substantially greater wall thicknesses than said separating walls to prevent mating of the connector and terminal assemblies when the conductor assembly is laterally offset from said predetermined desired orientation.

18. A terminal block assembly according to claim 15, wherein the terminal block assembly comprises a unitary molded assembly, formed from a flame resistant thermoplastic material.

19. A terminal block assembly according to claim 18, wherein said plurality of motor leads and terminals are molded in place in the thermoplastic housing.

20. A terminal block assembly according to claim 2, wherein said means on said housing for receiving a mating connector assembly further comprises a plurality of spaced-apart, generally vertical separating walls extending between the first and second horizontal side walls to create a plurality of open box-like enclosures around respective ones of the plurality of motor terminals mounted on the housing.

21. A terminal block assembly according to claim 2, wherein said means for securing the housing in an opening in the motor shell comprises a plurality of radially spaced flanges, including a fitted flange having a radius of curvature substantially equal to the radius of curvature of the motor shell and having dimensions which are substantially equal to dimensions of the opening in the motor shell such that edges of the fitted flange and the open abut, and including an outer flange, having a radius of curvature greater than the radius of curvature of the motor shell and having dimensions which are greater than the dimensions of the opening in the motor shell such that said outer flange extends beyond and covers the abutting edges of the fitted flange and the opening.

22. A terminal block assembly according to claim 2, wherein the terminal block assembly comprises a unitary molded assembly, formed from a flame resistant thermoplastic material.

23. A terminal block assembly according to claim 4, wherein said box-like structure comprises first and second generally vertical side walls extending outwardly from the exterior surface of said first horizontal side wall, and a generally horizontal portion connecting respective ends of said generally vertical side walls.

24. A terminal block assembly according to claim 23, wherein said generally vertical side walls and connecting horizontal portion define an opening for receiving a latching mechanism on the mating connector assembly, and wherein said horizontal portion interacts with a locking edge on the latching mechanism to secure the connector assembly in an engaged position.

25. A terminal block assembly according to claim 21, wherein said plurality of radially spaced flanges further include an inner flange having a radius of curvature less than the radius of curvature of the motor shell and having at least one dimension which is greater than a corresponding dimension of the opening such that at least a portion of the inner flange extends beyond a portion of the abutting edges of the fitted flange and the opening.

26. A terminal block assembly according to claim 25, wherein an edge of an end bell of the motor abuts an edge of the fitted flange, and wherein the outer flange extends beyond and covers the abutting edge of the end bell and fitted flange.

27. A terminal block assembly according to claim 22, wherein said plurality of motor leads and terminals are molded in place in the thermoplastic housing.

* * * * *